United States Patent [19]

Bean

[11] 4,247,369
[45] Jan. 27, 1981

[54] APPARATUS FOR CONTINUOUS DISTILLATION

[76] Inventor: Roy E. Bean, 23429 N. 89th Dr., Peoria, Ariz. 85345

[21] Appl. No.: 47,439

[22] Filed: Jun. 11, 1979

[51] Int. Cl.³ .............................. B01D 3/02; C02F 1/04
[52] U.S. Cl. ...................................... 202/176; 202/181; 202/180; 202/185 D; 202/234; 203/10
[58] Field of Search .......................... 202/190–196, 202/180, 177, 234, 176, 185 D, 181; 203/DIG. 17, 10, 11, 22

[56] References Cited

U.S. PATENT DOCUMENTS

| | | | |
|---|---|---|---|
| 176,260 | 4/1876 | Anthony | 202/192 |
| 790,901 | 5/1905 | Keith | 202/193 |
| 823,488 | 6/1906 | Barnstead | 202/185 D |
| 851,045 | 4/1907 | Ullrick | 202/196 |
| 969,625 | 9/1910 | Hoffine et al. | 202/196 |
| 1,010,508 | 5/1911 | McCune | 202/196 |
| 1,635,112 | 7/1927 | Carlson et al. | 202/196 |
| 2,254,538 | 9/1941 | Newman | 202/193 |
| 2,392,893 | 1/1946 | Williamson | 202/193 |
| 3,055,810 | 9/1962 | Skow | 202/193 |
| 3,532,606 | 10/1970 | Sibert | 202/185 D |
| 4,110,170 | 8/1978 | Kirschman et al. | 202/180 |
| 4,135,984 | 1/1979 | Kirschmann | 202/196 |

OTHER PUBLICATIONS

"Saline Water Distillation Processes"; A. Porteous, Longman Co., London, 1975; p. 76.

*Primary Examiner*—Wilbur L. Bascomb, Jr.
*Attorney, Agent, or Firm*—Norman B. Rainer

[57] ABSTRACT

A compact integral apparatus is provided for the continuous distillation of water. The apparatus comprises an upright cylindrical boiling vessel communicating at an upper portion thereof with a vapor condensation tube which leads into a water cooling tube disposed within a reservoir vessel. Water is supplied to said reservoir vessel through a float-controlled valve adapted to maintain a substantially constant amount of water in said reservoir vessel at a height sufficient to immerse said water cooling tube and thereby receive heat therefrom. Water to be distilled flows by gravity from said reservoir vessel to said boiling vessel. The component parts are structurally interconnected to facilitate facile mounting of the apparatus on a support structure.

4 Claims, 2 Drawing Figures

APPARATUS FOR CONTINUOUS DISTILLATION

BACKGROUND OF THE INVENTION

This invention relates to a distillation apparatus, and more particularly to improvements in an apparatus for the continuous automatic distillation of a volatile liquid such as water.

The purification of liquids by distillation is well known, and various types of equipment find widespread utilization in distillation operations. The requisite features of distillation apparatus generally include a boiling vessel, condensation means to cause the vapors created in the boiling vessel to return to the liquid state, and a receiver vessel to capture and confine the liquified product produced by the condensation means.

In distillation systems designed to handle a continuous feed stream of liquid to be purified, special control means are required to regulate the flow of liquid into the boiling vessel and to remove purified product from the receiver vessel and nondistillable residues from the boiling vessel. Such control means should be of simple and durable construction to enable the apparatus to function reliably for extended periods without maintenance.

Water distillation units of relatively small capacity designed for home or industrial use are generally required to be of compact size and amenable to easy installation and operation. Such units should preferably be further equipped with control means which facilitate intermittent operation. To reduce the cost of operation, particularly the cost of heating the water to volatilization, the distillation apparatus should be designed in a manner which affords efficient use and recovery of thermal energy.

Unlike complex fractionation systems capable of selectively condensing and isolating specific components of a volatile mixture, a distillation process merely separates volatile from non-volatile substances. If, for example, a water supply contains volatile impurities such as chlorine, chloramines and/or chlorinated organic species including chloroform known to be produced by chlorine, such species cannot be removed by ordinary distillation methods because they will co-distill and co-condense with the water. Although various techniques may be sequentially combined to purify water, practical single process means for the production of pure water from a feed stream containing volatile and nonvolatile impurities have not heretofore been available.

It is accordingly an object of the present invention to provide a compact, easily installed apparatus for the distillation of water continuously supplied to said apparatus.

It is another object of this invention to provide an apparatus of the aforementioned nature having the ability to remove from water substances more volatile than water.

It is a still further object to provide an apparatus of the aforementioned nature wherein the component functional parts of said apparatus are designed and arranged in a manner to efficiently utilize the thermal energy required to achieve distillation.

These and other objects and advantages of the invention will be apparent from the following description.

SUMMARY OF THE INVENTION

The above and other beneficial objects and advantages are accomplished in accordance with the present invention by the provision of an improved distillation apparatus which comprises an elongated vertically disposed cylindrical boiling vessel having an electrical heating element positioned adjacent the bottom thereof, a vented reservoir vessel which holds water awaiting distillation and sends said water by gravity flow through a transfer conduit to said boiling vessel, a float valve associated with said reservoir vessel which controls the admission of water from a water supply conduit in a manner to maintain a substantially constant water level in said reservoir vessel, a vapor condensation tube communicating at its entrance end with an upper portion of said boiling vessel, and communicating at its exit end with a water cooling tube disposed in a manner to be immersed in water confined within said reservoir vessel, and exit means for removing water from said water cooling tube, the various aforesaid components of said apparatus being interconnected in a manner causing said apparatus to have a structurally integral nature.

The boiling vessel is preferably provided with mounting means adjacent its upper extremity to facilitate attachment of the apparatus to a support member such as a wall. The reservoir vessel, in preferred embodiments, is of open top construction, thereby providing the maximum possible venting to the atmosphere.

The vapor condensation tube is preferably disposed directly above said reservoir vessel. Both the vapor condensation tube and the water cooling tube preferably have a spiral configuration. The exit means for removing water from said water cooling tube may be at an elevation lower than or equal to that end of said water cooling tube which joins with said vapor condensation tube.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
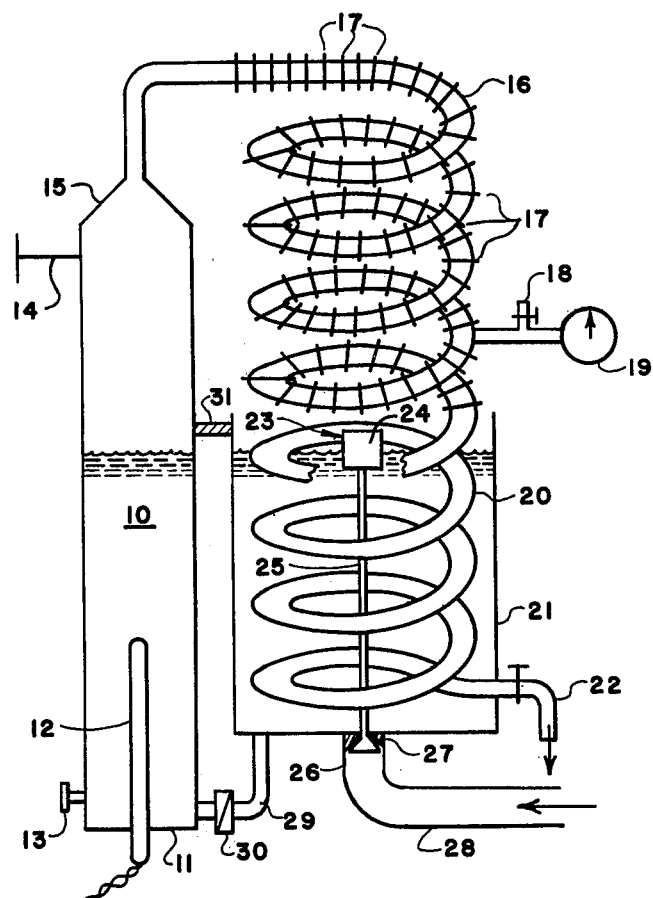
FIG. 1 is a vertical view partly in section of an embodiment of the apparatus of this invention.
Figure 2:
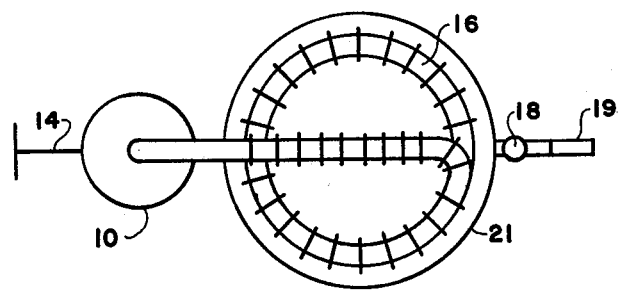
FIG. 2 is a plan view of the embodiment of FIG. 1.

Referring to FIG. 1, a distillation apparatus of the present invention is shown comprised of vertically upright boiling vessel 10 having positioned at the bottom 11 thereof electrical heating element 12. Valved drain means 13 is positioned in vessel 10 adjacent the bottom 11 thereof and adapted to cause removal of liquid residue from said vessel. A mounting bracket 14 engages vessel 10 adjacent the upper extremity thereof, said bracket being adapted to facilitate attachment of the distillation apparatus to a support structure. The upper extremity 15 of vessel 10 communicates with tube 16 adapted to achieve condensation of water vapor to produce water in the liquid state. Said tube 16 is of spiral configuration and provided with a multitude of cooling vanes 17 which function to increase the external heat transfer surface of tube 16. A pressure control valve 18 communicating with tube 16, and associated guage 19 affords the ability to regulate pressure within the distillation apparatus.

The lower extremity of downstream end of tube 16 merges in a continuous manner with the upper or upstream terminus of water cooling tube 20 having a spiral configuration. Said water cooling tube is positioned within cylindrical reservoir vessel 21 in a manner such that it will be immersed in water confined within said reservoir vessel. The lower or downstream terminus of water cooling tube 20 is provided with valve means 22 adapted to control the flow of water from said tube.

A float valve mechanism 23 is located within reservoir vessel 21 and adapted to control the level of water contained within said vessel. The float valve mechanism is comprised of a float 24 attached to vertical extension rod 25 having a valve head 26 at the lowermost extremity which mates with a correspondingly shaped valve seat 27. A water inlet conduit 28 provides a continuous supply of water to the aforesaid valve mechanism for controlled admission to reservoir vessel 21.

A transfer conduit 29 containing check-valve 30 delivers water by gravity flow from the bottom of reservoir vessel 21 to the bottom of boiling vessel 10. A connecting strut 31 achieves rigid structural integration of boiling vessel 10 with reservoir vessel 21.

In operation, water to be distilled is delivered by inlet conduit 28 to valve head 26 which controllably admits water into reservoir vessel 21. The water then flows through transfer conduit 29 to boiling vessel 10, thereby establishing equal levels of water in both vessels. The heating unit 12 causes volatilization of water. The water vapor (or steam) travels upwardly into vapor condensation tube 16, wherein cooling action is achieved by the passage of air, water or other coolant streams in contact with the outer periphery of said tube, causing the vapor to condense to liquid phase water. In the course of said cooling and condensing action, the heat earlier required to vaporize the water, namely 540 calories per gram of water, is given up to the cooling media, which is thereby raised to a higher temperature. If said cooling media is water, which is allowed to fall into reservoir vessel 21, the heat acquired by said water by virtue of contact with condensation tube 16 represents a saving of total energy required of heating element 12 to volatilize water in boiling vessel 10. If said cooling action is achieved by a flow of air as may be produced by a fan, the resultant stream of heated air may be directed so as to make efficient use of the heat.

The water which condenses in condensation tube 16 flows downwardly through water cooling tube 20 wherein heat is transferred from said condensed water to water held by reservoir vessel 21 awaiting distillation. Such transfer of heat preheats water prior to its entrance into boiling vessel 10, and represents a still further recovery of thermal energy. The heating of the water in the reservoir vessel also causes volatile substances dissolved in the water to leave the water through the air-water interface adjacent the top of the reservoir vessel, and thereby enter the ambient atmosphere. Such removal of volatile substances is enhanced by a large air-water interface and adequate venting to the atmosphere, as is obtained when the reservoir vessel is of an open top construction.

The condensed water, following its passage through water cooling tube 20, may be drawn off for use in either a continuous or discontinuous manner. When discontinuous removal of said water is sought, sensor means of well known design may be utilized to detect the amount of water within cooling tube 20, and turn off heater element 12 to conserve energy.

After prolonged periods of operation, non-distillable residues will accumulate in the water in boiling vessel 10. Removal of such material is achieved by periodic draining of water from boiling vessel 10 via drain means 13.

Because the various components of the apparatus are rigidly interconnected, the apparatus is caused to have a compact, integral construction amenable to facile attachment to a support structure such as a wall of a building.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for the continuous automatic distillation of water comprising:
   (a) an elongated vertically disposed cylindrical boiling vessel having heating means positioned adjacent the bottom thereof,
   (b) a vented reservoir vessel adapted to hold water awaiting distillation and transfer said water by gravity flow to said boiling vessel,
   (c) a float valve associated with said reservoir vessel adapted to control the admission of water from a water supply conduit in a manner to maintain a substantially constant water level in said reservoir vessel,
   (d) a transfer conduit communicating between said reservoir vessel and said boiling vessel in a manner whereby equal levels of water are established in said intercommunicating vessels,
   (e) a vapor condensation tube having an entrance end and exit end, said entrance end communicating with an upper portion of said boiling vessel,
   (f) a water cooling tube disposed below said vapor condensation tube as a continuous extension thereof, having an exit end associated with valve means for the controlled removal of water, said water cooling tube being positioned within said reservoir vessel below the normal water level therein, whereby water within said reservoir is raised to an elevated temperature which, in conjunction with the vented nature of said reservoir vessel, effects evaporative removal from said water of species dissolved therein more volatile than water,
   (g) the various aforesaid components of said apparatus being interconnected in a manner causing said apparatus to have a structurally integral nature permitting attachment to a support structure by mounting means associated with said boiling vessel.

2. Apparatus of claim 1 wherein said reservoir vessel is of cylindrical, open top construction.

3. Apparatus of claim 1 wherein said vapor condensation tube and water cooling tube are of spiral construction.

4. Apparatus of claim 1 wherein said heating means is comprised of an electrical heating element.

* * * * *